(12) United States Patent
Rodenbeck

(10) Patent No.: US 8,177,041 B2
(45) Date of Patent: May 15, 2012

(54) DAMPER ASSEMBLIES AND VEHICLES INCORPORATING THE SAME

(75) Inventor: Phillip David Rodenbeck, Valparaiso, IN (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 402 days.

(21) Appl. No.: 12/489,783

(22) Filed: Jun. 23, 2009

(65) Prior Publication Data
US 2010/0320705 A1 Dec. 23, 2010

(51) Int. Cl.
*F16F 9/34* (2006.01)
(52) U.S. Cl. .................. 188/266.5; 188/266.7; 188/274; 267/140.14
(58) Field of Classification Search ............. 267/140.14, 267/140.15; 188/266.1, 266.5, 266.7, 274
See application file for complete search history.

(56) References Cited

U.S. PATENT DOCUMENTS

| | | | |
|---|---|---|---|
| 2,576,658 A * | 11/1951 | Werner | 188/274 |
| 3,795,291 A * | 3/1974 | Naito et al. | 188/274 |
| 4,696,489 A | 9/1987 | Fujishiro et al. | |
| 4,815,575 A | 3/1989 | Murty | |
| 4,869,474 A * | 9/1989 | Best et al. | 267/136 |
| 4,954,957 A | 9/1990 | Kawagoe et al. | |
| 5,123,671 A | 6/1992 | Driessen et al. | |
| 5,142,475 A | 8/1992 | Matsunaga et al. | |
| 5,189,614 A | 2/1993 | Mitsuoka et al. | |
| 5,219,430 A * | 6/1993 | Antoine | 267/140.12 |
| 5,220,983 A * | 6/1993 | Furrer et al. | 188/274 |
| RE34,628 E | 6/1994 | Fujishiro et al. | |
| 5,398,184 A | 3/1995 | Yamaoka et al. | |
| 5,446,663 A | 8/1995 | Sasaki et al. | |
| 5,467,280 A | 11/1995 | Kimura | |
| 5,488,556 A | 1/1996 | Sasaki | |
| 5,490,068 A | 2/1996 | Shimizu et al. | |
| 5,510,985 A | 4/1996 | Yamaoka et al. | |
| 5,515,273 A | 5/1996 | Sasaki et al. | |
| 5,526,262 A | 6/1996 | Kimura et al. | |
| 5,559,701 A | 9/1996 | Shimizu et al. | |
| 5,598,337 A | 1/1997 | Butsuen et al. | |
| 5,620,068 A * | 4/1997 | Garnjost et al. | 188/378 |
| 5,691,899 A | 11/1997 | Terasaki | |
| 5,701,245 A | 12/1997 | Ogawa et al. | |
| 5,718,446 A | 2/1998 | Fuchida | |
| 5,802,478 A | 9/1998 | Iwasaki | |
| 5,810,384 A | 9/1998 | Iwasaki et al. | |
| 5,890,081 A | 3/1999 | Sasaki | |
| 5,911,768 A | 6/1999 | Sasaki | |
| 5,927,699 A * | 7/1999 | Nakajima et al. | 267/140.14 |
| 5,935,181 A | 8/1999 | Iwasaki | |
| 5,950,776 A | 9/1999 | Iwasaki et al. | |
| 5,984,062 A * | 11/1999 | Bobrow et al. | 188/378 |
| 6,062,551 A * | 5/2000 | Oku et al. | 267/140.14 |
| 6,082,719 A * | 7/2000 | Shtarkman et al. | 267/140.14 |
| 6,145,802 A * | 11/2000 | Nakagaki et al. | 267/140.14 |
| 6,247,685 B1 | 6/2001 | Takahashi | |
| 6,695,106 B2 * | 2/2004 | Smith et al. | 188/378 |
| 6,695,294 B2 * | 2/2004 | Miller et al. | 267/64.16 |
| 2008/0054540 A1 | 3/2008 | Buma | |
| 2010/0193305 A1* | 8/2010 | Suciu | 188/268 |

* cited by examiner

*Primary Examiner* — Bradley King
(74) *Attorney, Agent, or Firm* — Dinsmore & Shohl LLP

(57) ABSTRACT

A damper assembly includes damper body, a piston assembly and a pulser. The damper body is operable to maintain a fluid. The piston assembly may include a piston rod and a piston plunger. The piston plunger and at least a portion of piston rod is slidably positioned within the damper body. The pulser is operable to generate hydraulic waves within the fluid toward the piston assembly to alter the damping force of the damper assembly.

21 Claims, 6 Drawing Sheets

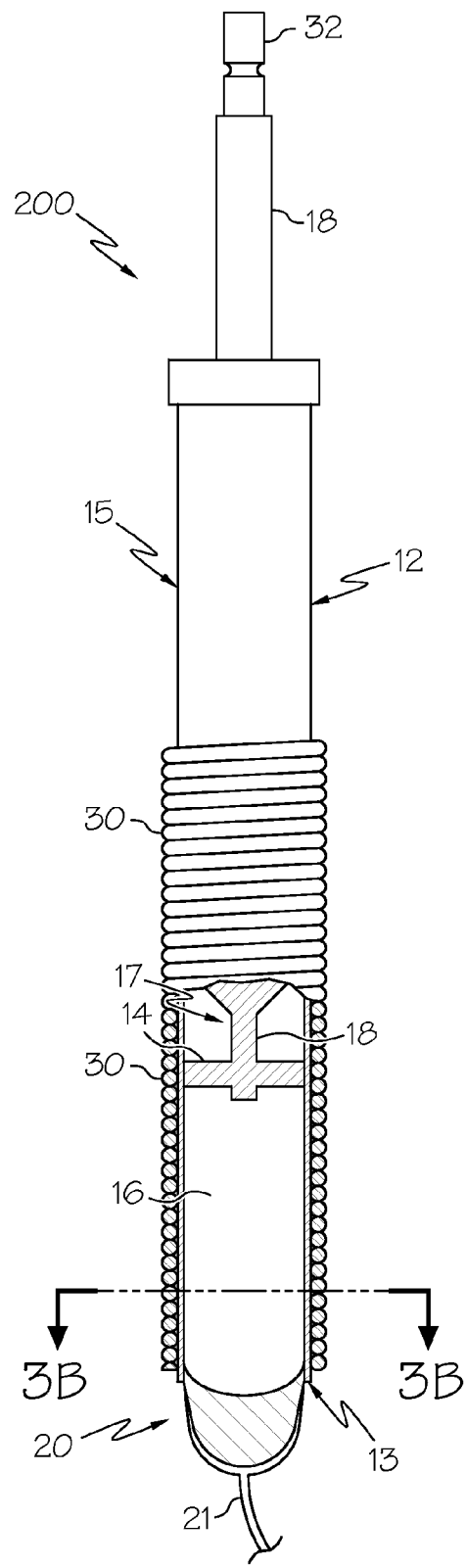
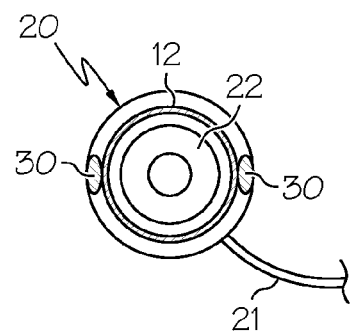
FIG. 3A
FIG. 3B

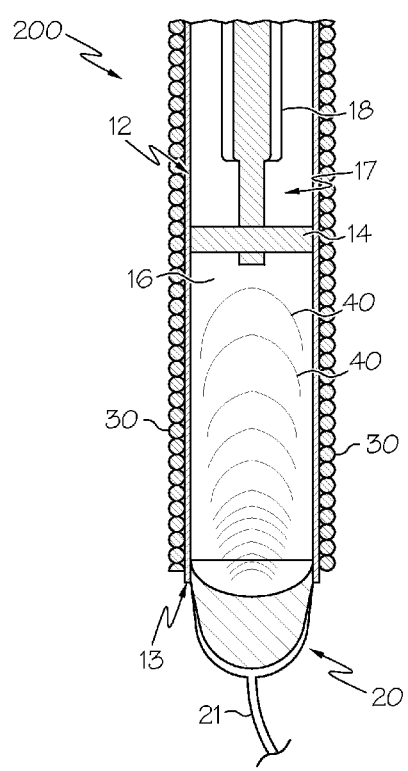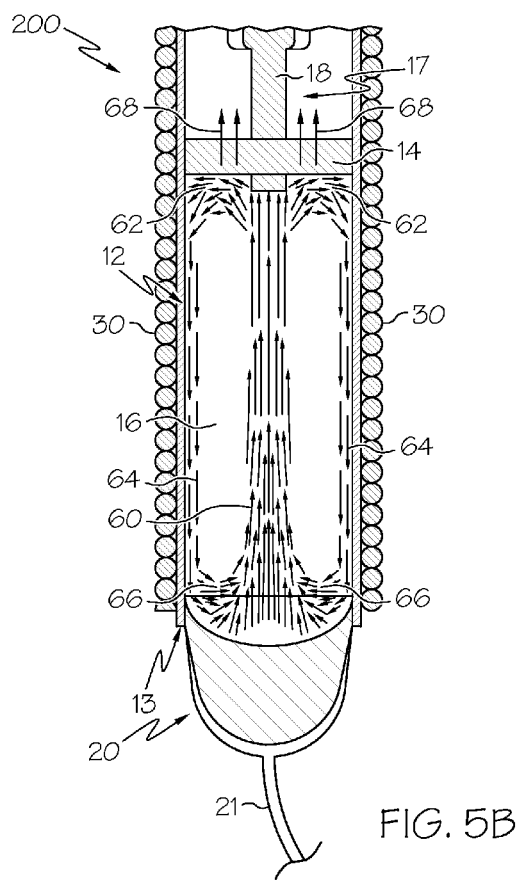

DAMPER ASSEMBLIES AND VEHICLES INCORPORATING THE SAME

TECHNICAL FIELD

The present invention generally relates to damper assemblies and, more particularly, to actively controlled damper assemblies and vehicles incorporating the same.

BACKGROUND

Many vehicles utilize dampers (i.e., shock absorbers) to absorb or dissipate energy resulting from imperfections in a driving surface, thereby effectuating an enjoyable and comfortable ride. Non-variable shock absorbers are tuned for a particular level of damping force. For example, if the shock absorbers are tuned for high damping force, then the vehicle will possess sportier handling characteristics while sacrificing ride comfort over imperfect driving surfaces (e.g., potholes or cracks in the road). Conversely, if the shock absorbers are tuned for low damping force, then the vehicle will possess more luxurious and comfortable handling characteristics at the cost of increased body motion during quick maneuvers.

Variable damping systems incorporate dampers that actively change damping force levels depending on a current driving scenario (e.g., sporty or aggressive driving) or current driving surface conditions. For example, during aggressive driving, the damping force of the dampers may actively increase to provide for a more rigid and stable ride. Conversely, if the road surface has many potholes, the damping force of the dampers may actively decrease, thereby providing a more comfortable ride. Current active damping system vary the damping force of the dampers by adjusting the flow of hydraulic fluid through a system of complicated electromechanical components, such as valves and levers. These active damping systems are expensive to manufacture and implement into vehicles, and are typically available in only high-end vehicle models.

Accordingly, a need exists for alternative active damper assemblies for dynamically varying the damping characteristics of a vehicle.

SUMMARY

In one embodiment, a damper assembly includes damper body, a piston assembly and a pulser. The damper body may be operable to maintain a fluid. The piston assembly may include a piston rod and a piston plunger, wherein the piston plunger and at least a portion of the piston rod is slidably positioned within the damper body. The pulser is operable to generate hydraulic waves within the fluid toward the piston assembly to alter the damping force of the damper assembly.

In another embodiment, a damper assembly includes a damper body having an upper end and a lower end, and a piston assembly. The piston assembly may include a piston rod and a piston plunger. The piston plunger and at least a portion of the piston rod is slidably positioned within the damper body such that a fluid reservoir is defined between the piston plunger and the lower end of the damper body. The damper assembly generates a force within the fluid reservoir opposite a downward motion of the piston plunger such that a damping force of the damper assembly is altered.

In yet another embodiment, a vehicle includes a damper assembly and a controller. The damper assembly may include a damper body having an upper end and a lower end, and a piston assembly. The piston assembly may include a piston rod and a piston plunger. The piston plunger and at least a portion of the piston rod is slidably positioned within the damper body such that a fluid reservoir is defined between the piston plunger and the lower end of the damper body. The controller is operable to provide a control signal to the damper to generate a force within the fluid reservoir that is opposite a downward motion of the piston plunger such that a damping force of the damper assembly is altered.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

FIG. 3A illustrates a cross section of an exemplary damper assembly having an exemplary heat exchanger according to one or more embodiments;

FIG. 3B illustrates a cross section of the exemplary damper assembly having an exemplary heat exchanger illustrated FIG. 3A along plane 3B according to one or more embodiments;

FIG. 5A illustrates a cross section of an exemplary damper assembly having a single pulser configuration and hydraulic waves propagating within the damper assembly according to one or more embodiments;

FIG. 5B illustrates a cross section of an exemplary damper assembly having a single pulser configuration and anticipated fluid flow within the damper assembly according to one or more embodiments;

DETAILED DESCRIPTION

Figure 1:
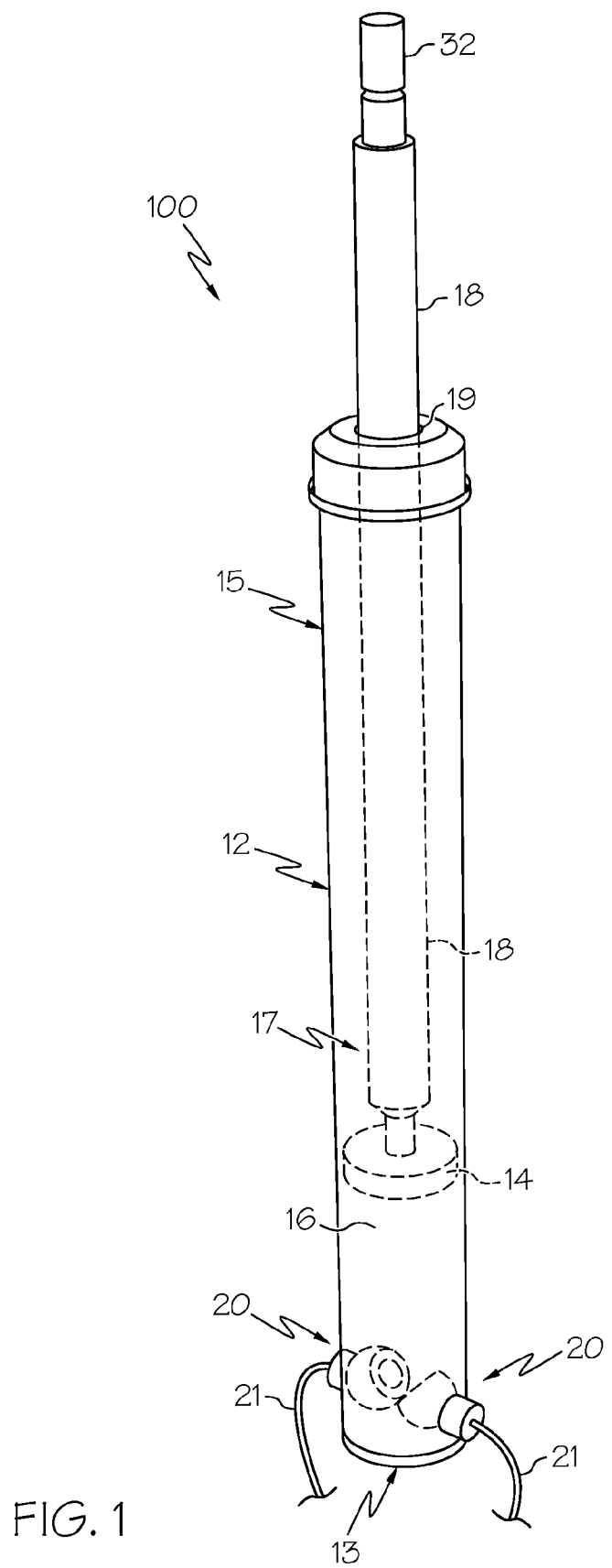
FIG. 1 illustrates a perspective view of an exemplary damper assembly according to one or more embodiments.

Referring to the drawings, damper assemblies may generally comprise a damper body filled with hydraulic fluid, a piston assembly and one or more pulsers. To vary the damping force, a variable force may be applied to the piston assembly that resists the downward motion of piston assembly during a compression cycle. The damper assemblies may generate such a force by producing hydraulic waves that propagate from the pulser or pulsers and collide with the piston assembly. The hydraulic waves may be used as a means to actively control and vary the damping characteristics of the damper assembly. The collision of the fluid particles upon the piston assembly detracts energy from the piston assembly, thereby causing it to lose speed and travel a shorter distance in the damper body. Damper assemblies, the various components of damper assemblies, and the incorporation of damper assemblies in a vehicle will be described in more detail herein.

Referring now to FIG. 1, an exemplary damper assembly 100 is illustrated. The damper assembly 100 comprises a cylindrically shaped damper body 12 having an opening 19 at an upper portion 15. The damper body 12 may be sealed at an opposite lower end (e.g., lower damper body end 13). The opening 19 may be substantially circular in shape, as depicted in FIG. 1, such that the opening 19 is suitable for receiving a piston rod 18 having a cylindrical configuration (described in detail below). However, it will be understood that the damper body 12 and the opening 19 in the damper body 12 may have various other geometrical configurations depending on the geometrical configuration of the piston rod 18 which may be disposed in the damper body 12. It will also be understood that the damper body 12 may have other geometrical configurations depending upon the application in which the damper assembly 100 is to be utilized. The damper body 12 may be made of any material capable of maintaining and damping large loads.

The damper assembly 100 illustrated in FIG. 1 further comprises a piston assembly 17 that is slidably positioned within the damper body 12. The piston assembly 17 comprises the cylindrical piston rod 18 and a piston plunger 14. The piston rod 18 is positioned in the damper body 12 through circular opening 19. The mechanical relationship between the piston rod 18 and the opening 19 is such that the piston rod 18 may slide upwardly and downwardly through the opening 19 during extension and compression cycles of the damper assembly 100. The piston rod 18 may have an upper mount portion 32 at an exposed end that is configured to mount to a vehicle chassis or a component of the vehicle suspension system.

In the embodiment illustrated in FIG. 1, the end of the piston rod 18 that is opposite from the upper mount portion 32 is coupled to a circular piston plunger 14. The piston plunger 14 is slidably positioned within the damper body 12 such that it may move up and down during extension and compression cycles. The geometric configuration of the piston plunger 14 is such that it corresponds to the geometric configuration of the damper body 12. In some embodiments, the piston rod 18 and the piston plunger 14 are integrated components. In other embodiments, the piston rod 18 and the piston plunger 14 are separate components that are mechanically coupled to form the piston assembly 17.

A fluid reservoir 16 within the damper body 12 may be defined between the piston plunger 14 and lower damper body end 13. The damper body 12 is configured to maintain a hydraulic fluid such that the fluid reservoir 16 is filled with hydraulic fluid. The hydraulic fluid may comprise conventional shock absorber hydraulic fluid. In some embodiments, the hydraulic fluid used may be configured such that it maintains a substantially constant viscosity at a variety of operating temperature. As described in more detail below, the piston plunger 14 may comprise slots (not shown) through which hydraulic fluid may pass during compression and extension cycles of the damper assembly 100.

Figure 2:
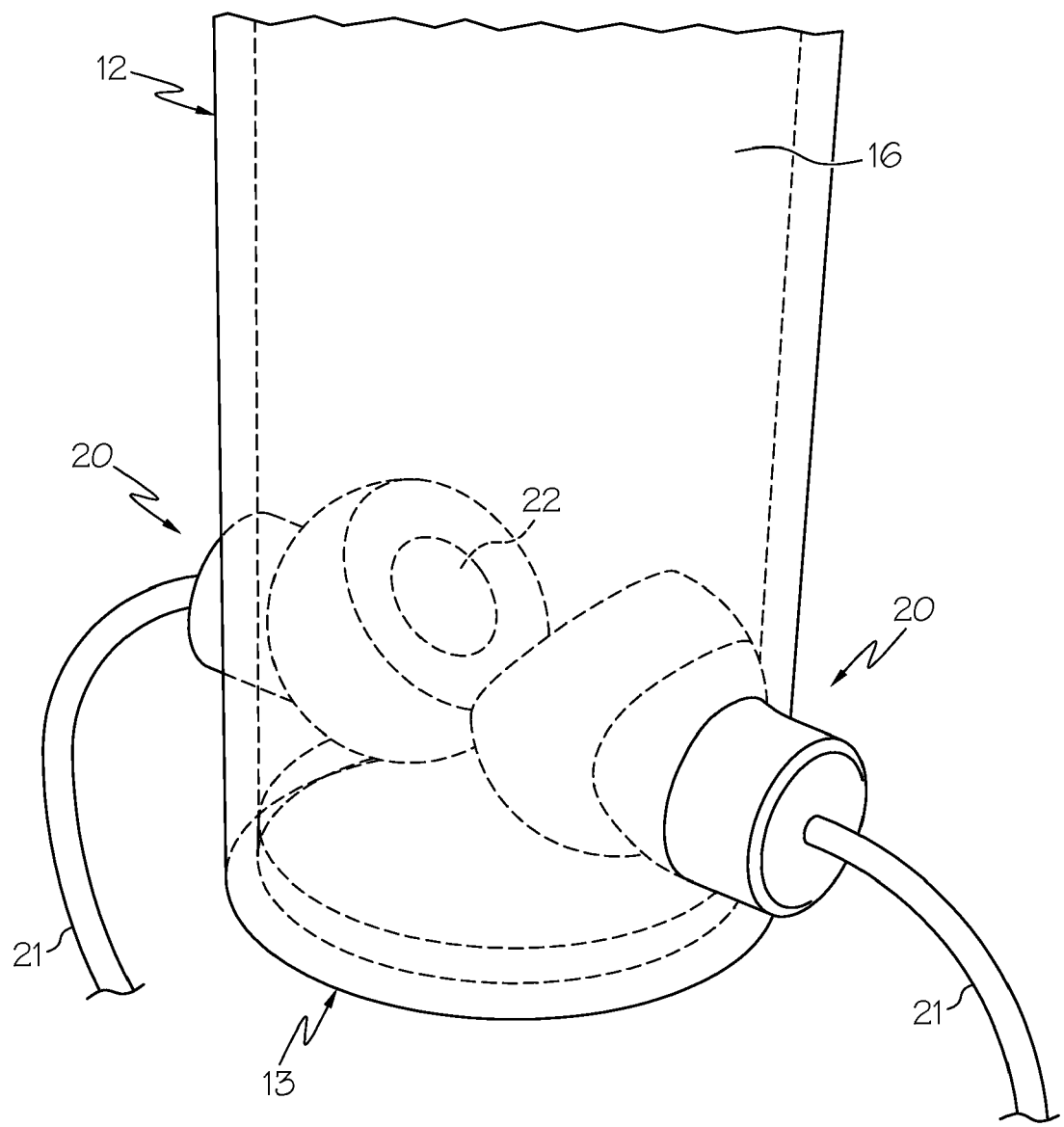
FIG. 2 illustrates an exemplary pulser configuration positioned within an exemplary damper body according to one or more embodiments.

Referring now to FIGS. 1 and 2, the illustrated damper assembly 100 further comprises two pulsers 20. It will be understood that embodiments of the damper assembly are not limited to the two pulser configuration as illustrated in FIGS. 1 and 2 and that any number of pulsers in any number of configurations are possible (e.g., the single pulser embodiment illustrated in FIGS. 3A, 3B, 5A and 5B). As described in detail herein below, the pulsers 20 may be configured to generate hydraulic waves within the hydraulic fluid that propagate toward the piston assembly 17. In the illustrated embodiment, two pulsers 20 are positioned within the damper body 12 near the lower damper body end 13. The pulser or pulsers 20 may also be located closer to piston plunger 14 in some embodiments or within the lower damper body end 13 in other embodiments (e.g., the pulser configuration of damper assembly 200 illustrated in FIGS. 3A, 3B, 5A and 5B). The two pulsers 20 may be located in opposition to one another so that the hydraulic waves generated by each pulser 20 may constructively interfere with one another prior to colliding with the piston plunger 14.

The pulsers 20 may comprise a vibrating structure 22 that is positioned within the damper body 12 such that the vibrating structure 22 is in contact with the hydraulic fluid. The vibrating structure 22 may be any device capable of vibrating at a particular frequency or variable frequencies within a frequency range. For example, the vibrating structure 22 may be a piezoelectric hydraulic pulsing disc that may be controlled to vibrate at varying frequencies by the application of current or voltage. In some embodiments, the pulser 20 may comprise a plurality of piezoelectric discs that are positioned in series to generate the hydraulic waves. The pulsers 20 are not limited to those devices capable of vibration. For example, the pulsers 20 may comprise a hydraulic jet or a turbine that is capable of generating hydraulic waves that are directed toward the piston assembly 17.

In the illustrated embodiment, the pulsers 20 may comprise an input, which may be a wired connection (e.g., signal wire 21) or a wireless connection. As described in more detail below, the pulsers 20 may be in electrical communication with a vehicle electronic control unit or other control unit 70 that may provide a control signal or signals 74 to the pulsers 20 (see FIG. 6A). The pulsers 20 may generate hydraulic waves in accordance with the control signal or signals received via the wired or wireless connection.

Referring now to FIGS. 3A and 3B, the damper assembly 200 may further comprise a heat exchanger 30. Because the viscosity of some types of hydraulic fluid may be sensitive to heat, some embodiments may utilize the heat exchanger 30 to remove heat from the hydraulic fluid that may be generated by the particle collisions occurring between the hydraulic fluid and the piston assembly 17. In the illustrated embodiment, the heat exchanger is configured as a coiled tube 30 that is wrapped around the damper body 12 starting at around an upper portion 15 and extending to the lower damper body end 13.

Cooled heat exchanger fluid may flow within the coiled tube 30 from an upper portion 15 of the damper body 12 to the lower damper body end 13. The coiled tube 30 may comprise a material with a low thermal resistance value such that heat may be transferred from the hydraulic fluid within the damper body 12 to the heat exchanger fluid that circulates through the coiled tube 30. The cooled heat exchanger fluid may originate from a dedicated pump and reservoir (not shown), or it may originate from a vehicle radiator (not shown). As the heat exchanger fluid travels within the coiled tube 30, it absorbs heat from the hydraulic fluid within the damper body 12. The temperature of the heat exchanger fluid at the top of the coil should be cool enough so that the fluid maintains proper operating temperature once it reaches the bottom of the damper body 12. The heat within the heat exchanger fluid may then be recaptured after the coiled tube 30 leaves the damper body 12 so that the recaptured heat may be utilized by other vehicular systems, such as temperature regulation systems. Possible temperature regulation systems include, but are not limited to, de-icing systems, cabin temperature regulation systems and cleansing systems. Additionally, turbines located within the vehicle after the coiled tube 30 may be use the generated heat to power electric generators.

Figure 4A:
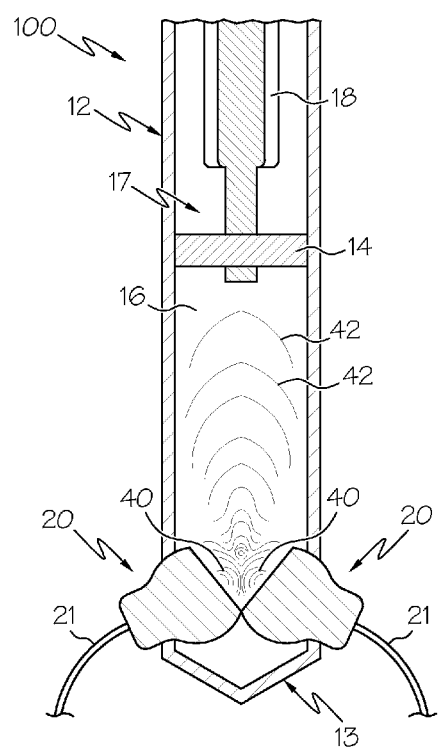
FIG. 4A illustrates a cross section of an exemplary damper assembly having a two pulser configuration and hydraulic waves propagating within the damper assembly according to one or more embodiments.

The operation of exemplary damper assemblies as described and illustrated herein will now be described. The pulsers 20 may be utilized to generate hydraulic waves that quickly detract energy from the piston assembly 17 so that it decelerates and consequently travels a smaller distance within the damper body 12, resulting in flat handling, which is desirable for performance driving. Referring to FIG. 4A, a damper assembly 100 having a two pulser configuration is illustrated in cross section. As described above, the pulsers 20, which in the illustrated embodiment are positioned opposing one another within the damper body 12, may receive a control signal 74 from a control unit 70, such as an on-board electronic control unit (ECU) or a damping selector unit 90 (both are described in more detail below and illustrated in FIGS. 6A and 6B). The control signal 74 may cause each of the pulsers 20 to vibrate at a frequency in accordance with the control signal 74. These vibrations are transmitted into the hydraulic fluid maintained in the damper body 12, thereby creating hydraulic waves 40. The hydraulic waves illicit collisions between the piston assembly 17 and highly energized hydraulic particles.

Still referring to FIG. 4A, the pulsers 20 of the illustrated embodiment are arranged and calibrated such that the hydraulic waves 40 created by the two pulsers 20 constructively interfere to generate conic hydraulic waves 42 of a greater magnitude than the waves 40 independently produced by the pulsers 20. The depicted waves 40, 42 are for illustrative purposes only. The hydraulic fluid particles that are pushed along by the combined hydraulic waves 42 travel toward the piston assembly 17 at a high velocity. When the hydraulic fluid particles collide with the piston plunger 14, they detract energy from the piston assembly 17, thereby slowing down the piston assembly 17 as it travels downward within the damper body 12 during a compression cycle. By varying the frequency of the pulser 20 vibration, the momentum of the particle collisions may be controlled, which consequently alters and controls the damping characteristics (i.e., the damping force) of the damper assembly 100. In this manner, the damping force of the damper assembly 100 may be increased by controlling the pulsers 20 to vibrate at a higher frequency.

Figure 4B:
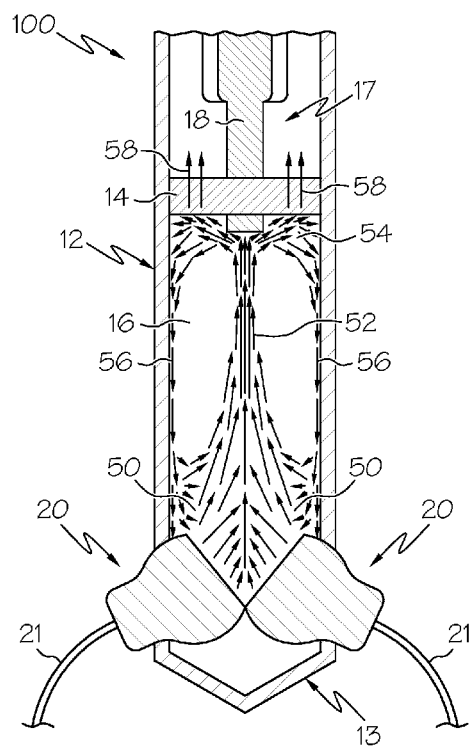
FIG. 4B illustrates a cross section of an exemplary damper assembly having a two pulser configuration and anticipated fluid flow within the damper assembly according to one or more embodiments.

FIG. 4B is an illustration of anticipated hydraulic fluid flow within the exemplary damper assembly 100 illustrated in FIG. 4A. It will be understood that FIG. 4B is for illustrative purposes only, as it is only an illustration of anticipated hydraulic fluid flow and not an illustration of actual hydraulic fluid flow. The fluid particles emitted from the pulsers 20 (i.e., represented by arrows 50) combine into a hydraulic fluid particle path as indicated by arrows 52. The fluid particles collide with the piston assembly 17, consequently decelerating the piston assembly 17 as it travels within the damper body 12. Some of the hydraulic fluid particles may pass through slots positioned within the piston plunger 14 as indicated by arrows 58. The remaining fluid particles as indicated by arrows 54 will be reflected and travel back down the damper body 12 in a path indicated by arrows 56 where they are again picked up in the hydraulic pulse waves and forced upward toward the piston assembly 17. The resulting effect is the formation of a donut shaped eddie within the fluid reservoir 16 of the damper body 12, providing increased amounts of resistance when the piston assembly 17 is compressing the hydraulic fluid.

FIGS. 5A and 5B are cross sectional illustrations of an exemplary damper assembly 200 having a single pulser 20 configuration. The pulser 20 of the illustrated embodiment is centrally positioned at the lower damper body end 13. The pulser 20 vibrates at a frequency corresponding to a control signal 74 received via wire 21, creating conically shaped hydraulic waves 40. The depicted waves 40 are for illustrative purposes only. The hydraulic waves 40 carry highly energized hydraulic particles toward the piston assembly 17. As described above, the collision of the hydraulic particles with the piston assembly 17 increase the damping force of the damper assembly 200.

FIG. 5B is an illustration of anticipated hydraulic fluid flow within the exemplary damper assembly 200 illustrated in FIG. 5A. As stated with respect to FIG. 4B, it will be understood that FIG. 5B is for illustrative purposes only, as it is only an illustration of anticipated hydraulic fluid flow and not an illustration of actual hydraulic fluid flow. The fluid particles are emitted from the pulser 20 as indicated by arrows 60 where they then collide into the piston assembly 17, consequently decelerating the piston assembly 17 as it travels within the damper body 12. Some of the hydraulic fluid particles may pass through slots positioned within the piston plunger 14 as indicated by arrows 68. The remaining fluid particles are reflected by the piston assembly 17 as indicated by arrows 62. These fluid particles flow back down the damper body 12 as indicated by arrows 64 where they are again picked up in the hydraulic pulse waves (arrows 66) and forced upward toward the piston assembly 17. Similar to the embodiment described and illustrated in FIG. 4B, the resulting effect is the formation of a donut shaped eddie within the fluid reservoir 16 of the damper body 12, providing increased amounts of resistance when the piston assembly is compressing the hydraulic fluid.

Embodiments of the damper assemblies described and illustrated herein may be implemented within a dynamic damping system 400 in a motor vehicle. For example, if the vehicle is a passenger car, four damper assemblies may be incorporated into a suspension system (which may comprise many additional components) to couple the four wheels of the car to the chassis. Embodiments of the damper assemblies described and illustrated herein may provide for a continuously variable damping system that may improve vehicle handling characteristics and passenger comfort across a broad range of driving scenarios.

Figure 6A:
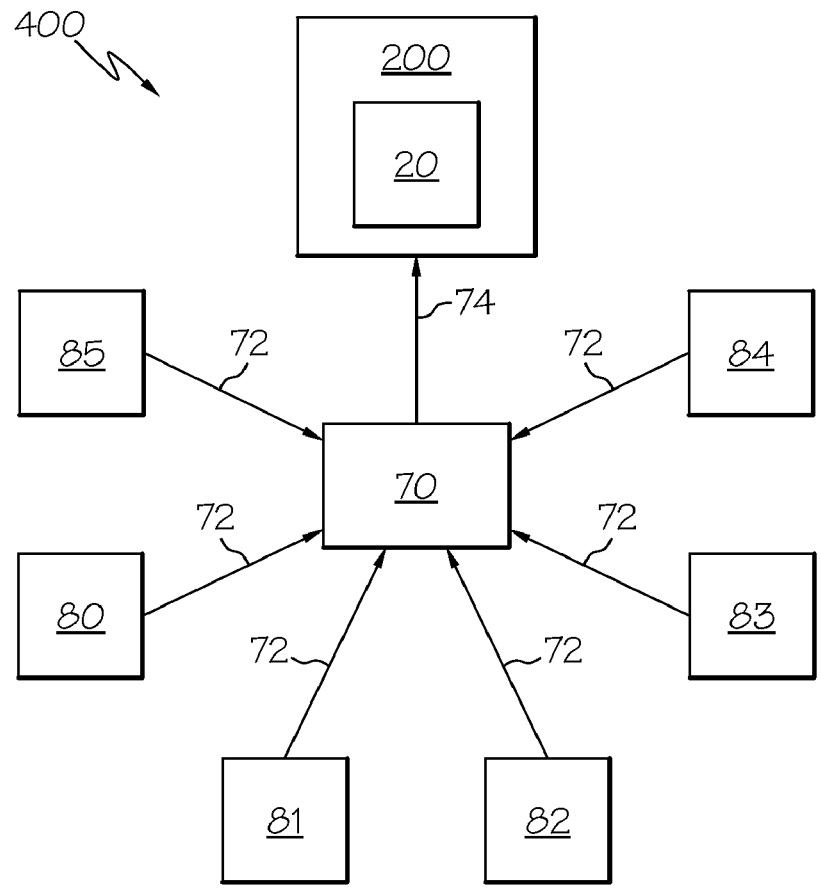
FIG. 6A is a schematic illustrating an exemplary dynamic damping system according to one or more embodiments.

Referring to FIG. 6A, a damper assembly 200 is schematically illustrated as comprising one or more pulsers 20, and electrically coupled to a controller 70, such as a on-board ECU. The controller 70 may be electrically coupled to one or more vehicle feedback sensors 80-85. The sensors 80-85 may be configured to dynamically provide the controller 70 with a status signal 72 that corresponds to a particular vehicle operating condition. Such sensors, which may be dedicated to the dynamic damping system 400 or shared with other vehicular systems (e.g., an anti-lock brake system), may include, but are not limited to, roll, pitch, steering angle, acceleration, and wheel motion sensors, as well as many others. Although FIG. 6A illustrates the use of six sensors, more or fewer sensors may be utilized.

The sensors 80-85 may actively measure and provide the controller 70 with road, driving and vehicle conditions data. With this data, the controller 70, which may be electrically coupled to any number of damper assemblies 200, may then dynamically diagnose the current driving scenario and send an appropriate control signal or signals 74 to the damper assemblies 200 so that the damping characteristics of the damper assemblies 200 located on the vehicle may be adjusted accordingly. The control signal or signals 74 may be transmitted by a wire 21 (see FIG. 1, for example) or by a wireless communication path. Because the dynamic damping system 400 enables the ability to actively change damping force levels in accordance with the current driving scenario by varying the control signal, it is able to provide the proper handling characteristics at the proper times. For example, if bumps, cracks, potholes and other surface imperfections are detected by the sensors 80-85, the controller 70 may instruct the pulsers 20 to turn off so that the vehicle may be adequately dampened, causing the vehicle operator minimal discomfort. Additionally, when the sensors 80-85 detect that the vehicle is being driven in performance fashion (e.g., fast acceleration or hard cornering), the controller 70 may instruct the pulsers 20 to vibrate at a high frequency so that the damping force of the damper assembly 200 may be increased to provide a stiff, responsive ride with minimal vehicle body motion.

Figure 6B:
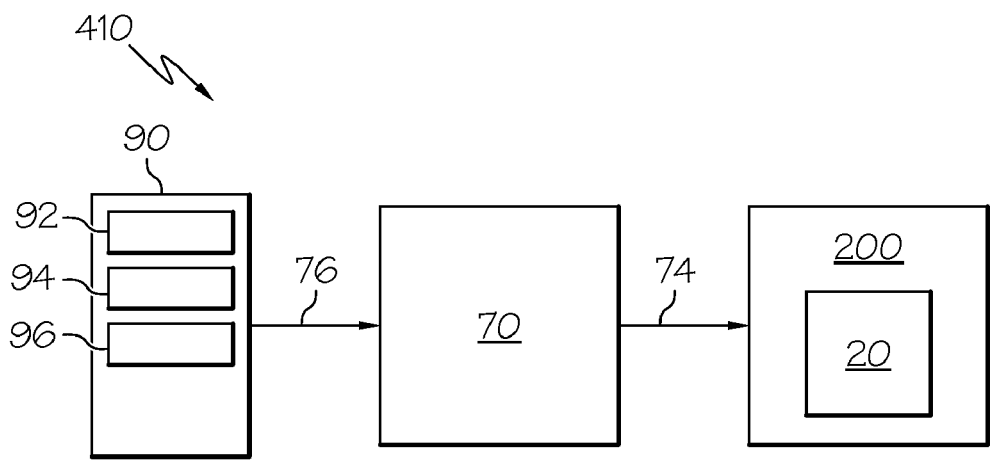
FIG. 6B is a schematic illustrating an exemplary dynamic damping system according to one or more embodiments.

Referring now to FIG. 6B, a dynamic damping system 410 may comprise a damping selector unit 90. The damping selector unit 90 may function as a manual damping controller that provides a number of driver selectable settings that adjust the frequency range in which the pulsers 20 operate. The damping selector unit 90 may provide a manual control signal 76 to the controller 70, and the controller may provide a corresponding control signal 74 to the damper assembly 200. For example, if the driver selects a Sport setting (e.g., selector button 92) on the damping selector unit 90, the pulsers 20 may continuously vibrate in a higher frequency range to ensure that the vehicle body is stable. Conversely, if the driver selects a Comfort setting (e.g., selector button 94), the pulsers 20 may default to a low frequency range or turn off, allowing the damper assembly to better dampen rough surfaces. Additional settings may be provided, such as a setting effectuated by selector button 96. The damper selector unit 90 may be of any configuration that allows a user to select the level of damping force he or she desires. Such configurations may include, but are not limited to, toggle switches, push button switches, encoders, dials and soft keys displayed on a graphical user interface (e.g., an on-board computer or navigation system). The damping selector unit 90 may be utilized either in conjunction with or separate from the plurality of sensors 80-85 of the damping system 400 described and illustrated in FIG. 6A.

For the purposes of describing and defining the present invention it is noted that the term "substantially," when utilized herein, represents the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

It is noted that recitations herein of a component of the present invention being "configured" or "operable" in a particular way, "configured" or "operable" to embody a particular property, or function in a particular manner, are structural recitations as opposed to recitations of intended use. More specifically, the references herein to the manner in which a component is "configured" or "operable" denotes an existing physical condition of the component and, as such, is to be taken as a definite recitation of the structural characteristics of the component.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A shock absorber for coupling a wheel to a suspension system of a vehicle, the shock absorber comprising:
   a damper body comprising an upper end and a lower end, wherein the damper body is hollow;
   a piston assembly comprising a piston rod and a piston plunger, wherein:
      the piston plunger and at least a portion of the piston rod is slidably enclosed within the damper body;
      the piston rod extends out of the upper end of the damper body;
      the piston plunger is positioned within the damper body such that a fluid chamber is defined within the damper body between the lower end of the damper body and the piston plunger; and
      the piston plunger comprises one or more slots operable to pass fluid from the fluid chamber to a region within the damper body that is between the upper end of the damper body and the piston plunger during a down stroke of the piston assembly within the damper body; and
   a pulser operable to generate hydraulic waves that form a donut shaped eddie within the fluid that propagates toward the piston assembly, wherein the hydraulic waves alter the damping force of the shock absorber.

2. The shock absorber as claimed in claim 1 wherein the pulser is operable to generate the hydraulic waves by vibrating at a vibration frequency.

3. The shock absorber as claimed in claim 2 wherein the damping force of the shock absorber is varied by a change in the vibration frequency of the pulser.

4. The shock absorber as claimed in claim 3 wherein the vibration of the pulser at a higher frequency produces a higher damping force than the vibration of the pulser at a lower frequency.

5. The shock absorber as claimed in claim 3 wherein the pulser comprises an input operable to receive a control signal such that the vibration frequency of the pulser is varied in accordance with the control signal.

6. The shock absorber as claimed in claim 1 wherein the pulser comprises a piezoelectric pulsing disc operable to vibrate at a variable vibration frequency.

7. The shock absorber as claimed in claim 1 wherein the shock absorber comprises a second pulser.

8. The shock absorber of claim 7 wherein the second pulser is orientated such that it opposes the pulser, and the hydraulic waves generated by the first pulser constructively interfere with the hydraulic waves generated by the second pulser to generate conic hydraulic waves that propagate toward the piston assembly.

9. The shock absorber as claimed in claim 1 wherein the shock absorber further comprises a heat exchanger operable to remove heat from the fluid maintained within the damper body.

10. The shock absorber as claimed in claim 9 wherein the heat exchanger comprises a coiled tube positioned around an exterior surface of the damper body, the heat exchanger operable to circulate a heat exchanger fluid such that cool heat exchanger fluid enters the heat exchanger at a first end of the coiled tube and warm heat exchanger fluid exits the heat exchanger at a second end of the coiled tube.

11. A shock absorber comprising:
a damper body having an upper end and a lower end; and
a piston assembly comprising a piston rod and a piston plunger, wherein the piston plunger and at least a portion of the piston rod is slidably enclosed within the damper body such that a fluid reservoir is defined between the piston plunger and the lower end of the damper body; and
a first pulser positioned at a first location proximate the lower end of the damper body, the first pulser comprising a first vibrating structure;
a second pulser positioned at a second location proximate the lower end of the damper body, the second pulser comprising a second vibrating structure, wherein:
the second location of the damper body opposes the first location of the damper body;
the first pulser and second pulser are operable to generate hydraulic waves within fluid maintained in the fluid reservoir;
the first vibrating structure of the first pulser is orientated toward the second vibrating structure of the second pulser such that the hydraulic waves generated by the first pulser constructively interfere with the hydraulic waves generated by the second pulser to generate conic hydraulic waves that propagate toward the piston assembly; and
the conic hydraulic waves strike the piston plunger to generate a force within the fluid reservoir opposite a downward motion of the piston plunger such that a damping force of the shock absorber is altered.

12. The shock absorber as claimed in claim 10 wherein the first pulser and the second pulser are operable to generate the hydraulic waves by actuating the first and second vibrating structures at a vibration frequency.

13. The shock absorber as claimed in claim 12 wherein the damping force of the shock absorber is varied by a change in the vibration frequency of the first and second vibrating structures.

14. The shock absorber as claimed in claim 11 wherein the shock absorber further comprises a heat exchanger operable to remove heat from the fluid maintained within the damper body.

15. The shock absorber as claimed in claim 14 wherein the heat exchanger comprises a coiled tube positioned around an exterior surface of the damper body, the heat exchanger operable to circulate a heat exchanger fluid such that cool heat exchanger fluid enters the heat exchanger at a first end and warm heat exchanger fluid exits the heat exchanger at a second end.

16. A vehicle comprising:
a shock absorber comprising:
a damper body having an upper end and a lower end
a piston assembly comprising a piston rod and a piston plunger, wherein:
the piston plunger and at least a portion of the piston rod is slidably enclosed within the damper body;
the piston rod extends out of the upper end of the damper body;
the piston plunger is positioned within the damper body such that a fluid chamber is defined within the damper body between the lower end of the damper body and the piston plunger; and
the piston plunger comprises one or more slots operable to pass fluid from the fluid chamber to a region within the damper body that is between the upper end of the damper body and the piston plunger during a down stroke of the piston assembly within the damper body; and
a pulser operable to generate hydraulic waves that form a donut shaped eddie within the fluid that propagates toward the piston assembly, wherein the hydraulic waves alter the damping force of the shock absorber; and
a controller operable to provide a control signal to the shock absorber to cause the pulser to generate a force within the fluid maintained within the fluid reservoir that is opposite a downward motion of the piston plunger such that a damping force of the shock absorber is altered.

17. The vehicle as claimed in claim 16 wherein:
the vehicle further comprises a sensor operable to produce a status signal corresponding to a vehicle operating condition; and
the controller is further operable to receive the status signal from the sensor and vary the control signal provided to the shock absorber based at least in part on the received status signal.

18. The vehicle as claimed in claim 16 wherein the pulser is operable to generate the hydraulic waves by vibrating at a vibration frequency.

19. The vehicle as claimed in claim 16 wherein the vehicle further comprises a damping selector unit comprising:
a first driver-selectable damping setting, wherein when the damping selector unit is in the first damping setting, the damping selector unit provides a first manual control signal to the controller such that the pulser vibrates within a first frequency range; and
a second driver-selectable damping setting, wherein when the damping selector unit is in the second damping setting, the damping selector unit provides a second manual control signal to the controller such that the pulser vibrates within a second frequency range that is less than the first frequency range.

20. The vehicle as claimed in claim 16 wherein:
the shock absorber comprises a heat exchanger operable to remove heat from the fluid maintained within the damper body; and
the vehicle comprises a temperature regulation system coupled to the heat exchanger and operable to receive the heat removed by the heat exchanger.

21. The vehicle as claimed in claim 16 wherein the shock absorber comprises a second pulser.

* * * * *